United States Patent
Croteau et al.

(10) Patent No.: US 9,475,104 B2
(45) Date of Patent: *Oct. 25, 2016

(54) DISPLAY SURFACE CLEANING SYSTEM

(71) Applicant: K2Invent LLC, Grosse Pointe Farms, MI (US)

(72) Inventors: Keith G. Croteau, Grosse Pointe Farms, MI (US); Kevin E. Willey, Fort Collins, CO (US)

(73) Assignee: K2Invent LLC, Grosse Pointe Farms, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,957

(22) Filed: Sep. 30, 2015

(65) Prior Publication Data

US 2016/0023253 A1    Jan. 28, 2016

Related U.S. Application Data

(63) Continuation of application No. 14/028,741, filed on Sep. 17, 2013, now Pat. No. 9,180,495.

(60) Provisional application No. 61/837,987, filed on Jun. 21, 2013, provisional application No. 61/749,735, filed on Jan. 7, 2013, provisional application No. 61/702,155, filed on Sep. 17, 2012.

(51) Int. Cl.
| | |
|---|---|
| *A47L 25/00* | (2006.01) |
| *B08B 11/00* | (2006.01) |
| *B08B 11/02* | (2006.01) |
| *B65D 85/00* | (2006.01) |
| *B08B 1/00* | (2006.01) |
| *H04M 1/21* | (2006.01) |

(52) U.S. Cl.
CPC ............... *B08B 11/02* (2013.01); *A47L 25/00* (2013.01); *B08B 1/006* (2013.01); *B08B 11/00* (2013.01); *B65D 85/00* (2013.01); *H04M 1/21* (2013.01); *H04M 2250/22* (2013.01)

(58) Field of Classification Search
CPC ....... A47L 13/17; A47L 25/00; B08B 11/00; B08B 1/006; B08B 11/02; B65D 85/00
See application file for complete search history.

(56) References Cited

U.S. PATENT DOCUMENTS

| | | |
|---|---|---|
| 410,798 A | 9/1889 | Long |
| 1,095,744 A | 5/1914 | Smith |

(Continued)

FOREIGN PATENT DOCUMENTS

| | | |
|---|---|---|
| JP | 2004-312143 | 11/2004 |
| JP | 3124741 | 8/2006 |

(Continued)

OTHER PUBLICATIONS

U.S. Appl. No. 61/702,155, filed Sep. 17, 2012.

(Continued)

*Primary Examiner* — Randall Chin
(74) *Attorney, Agent, or Firm* — Craig R. Miles; CR Miles P.C.

(57) ABSTRACT

A display surface cleaning system which includes a display surface cleaning assembly which can be utilized discrete from or coupled proximate a user interactive display surface of a device and methods of using such display surface cleaning assembly.

12 Claims, 6 Drawing Sheets

(56) References Cited

U.S. PATENT DOCUMENTS

| | | | |
|---|---|---|---|
| 2,411,310 A | 11/1946 | Wilkins | |
| 4,875,247 A | 10/1989 | Berg | |
| 5,461,747 A | 10/1995 | Clausen et al. | |
| 5,956,794 A | 9/1999 | Skiba et al. | |
| 6,003,663 A | 12/1999 | Newcomer | |
| 6,923,313 B1 | 8/2005 | Orogun-Thomas | |
| 7,431,983 B2 | 10/2008 | Amano | |
| 8,225,928 B2 | 7/2012 | Perrier et al. | |
| 8,267,251 B2 | 9/2012 | Mongan et al. | |
| D673,569 S | 1/2013 | Smith et al. | |
| D673,936 S | 1/2013 | Michie et al. | |
| D673,938 S | 1/2013 | Weller et al. | |
| D673,939 S | 1/2013 | Chang et al. | |
| D673,940 S | 1/2013 | Chang et al. | |
| D673,941 S | 1/2013 | Melanson et al. | |
| D673,942 S | 1/2013 | Magness et al. | |
| D674,790 S | 1/2013 | Melanson et al. | |
| D674,791 S | 1/2013 | Melanson et al. | |
| D674,792 S | 1/2013 | Magness | |
| D675,209 S | 1/2013 | Glanzer et al. | |
| 8,342,325 B2 | 1/2013 | Rayner | |
| D675,603 S | 2/2013 | Melanson et al. | |
| D675,624 S | 2/2013 | Wibby et al. | |
| D676,035 S | 2/2013 | Chang et al. | |
| D676,036 S | 2/2013 | Chang et al. | |
| D676,433 S | 2/2013 | Smith et al. | |
| D676,434 S | 2/2013 | Chang et al. | |
| D676,435 S | 2/2013 | Chang et al. | |
| D676,838 S | 2/2013 | Magness et al. | |
| D676,840 S | 2/2013 | Chang et al. | |
| D676,841 S | 2/2013 | Magness et al. | |
| D676,842 S | 2/2013 | Weller et al. | |
| D676,844 S | 2/2013 | Weller et al. | |
| D676,845 S | 2/2013 | Melanson et al. | |
| D677,251 S | 3/2013 | Melanson et al. | |
| 8,393,466 B2 | 3/2013 | Rayner | |
| 8,395,894 B2 | 3/2013 | Richardson et al. | |
| D680,522 S | 4/2013 | Melanson | |
| D681,020 S | 4/2013 | Magness et al. | |
| D681,022 S | 4/2013 | Chang et al. | |
| D681,023 S | 4/2013 | Weller et al. | |
| D681,024 S | 4/2013 | Chang et al. | |
| D681,025 S | 4/2013 | Chang et al. | |
| D681,026 S | 4/2013 | Weller et al. | |
| D681,613 S | 5/2013 | Magness et al. | |
| D681,616 S | 5/2013 | Weller et al. | |
| D681,617 S | 5/2013 | Weller et al. | |
| D681,618 S | 5/2013 | Magness et al. | |
| D681,619 S | 5/2013 | Smith | |
| D681,621 S | 5/2013 | Magness | |
| D681,622 S | 5/2013 | Melanson et al. | |
| D681,623 S | 5/2013 | Chang et al. | |
| D683,339 S | 5/2013 | Weller et al. | |
| D683,340 S | 5/2013 | Chang et al. | |
| D683,341 S | 5/2013 | Melanson et al. | |
| D683,955 S | 6/2013 | Melanson et al. | |
| D684,149 S | 6/2013 | Chang et al. | |
| D684,568 S | 6/2013 | Fitzgerald et al. | |
| D687,025 S | 7/2013 | Wilkson et al. | |
| D687,027 S | 7/2013 | Melanson et al. | |
| 8,479,875 B2 | 7/2013 | Richardson et al. | |
| 8,526,180 B2 | 9/2013 | Rayner | |
| 9,180,495 B2 * | 11/2015 | Croteau | B65D 85/00 |
| 2004/0246386 A1 | 12/2004 | Thomas et al. | |
| 2006/0279924 A1 | 12/2006 | Richardson et al. | |
| 2007/0139873 A1 | 6/2007 | Thomas et al. | |
| 2007/0297149 A1 | 12/2007 | Richardson et al. | |
| 2009/0250487 A1 | 10/2009 | Choate | |
| 2010/0008028 A1 | 1/2010 | Richardson et al. | |
| 2010/0017982 A1 | 1/2010 | Pohkamp | |
| 2010/0147737 A1 | 6/2010 | Richardson et al. | |
| 2010/0182738 A1 | 7/2010 | Visser et al. | |
| 2010/0224519 A1 | 9/2010 | Kao | |
| 2011/0073608 A1 | 3/2011 | Richardson et al. | |
| 2011/0186076 A1 | 8/2011 | Appleton | |
| 2011/0210018 A1 | 9/2011 | Friedman et al. | |
| 2011/0210020 A1 | 9/2011 | Jones | |
| 2011/0226545 A1 | 9/2011 | Richardson et al. | |
| 2011/0228458 A1 | 9/2011 | Richardson et al. | |
| 2011/0228459 A1 | 9/2011 | Richardson et al. | |
| 2011/0289713 A1 | 12/2011 | Sa | |
| 2012/0018323 A1 | 1/2012 | Johnson et al. | |
| 2012/0074005 A1 | 3/2012 | Johnson et al. | |
| 2012/0138490 A1 | 6/2012 | Hollander et al. | |
| 2012/0261306 A1 | 10/2012 | Richardson et al. | |
| 2012/0325689 A1 | 12/2012 | Wibby et al. | |
| 2013/0067671 A1 | 3/2013 | Lee | |
| 2013/0099637 A1 | 4/2013 | Richardson et al. | |
| 2014/0137348 A1 | 5/2014 | Lodge et al. | |
| 2014/0345074 A1 | 11/2014 | Lee | |

FOREIGN PATENT DOCUMENTS

| | | |
|---|---|---|
| JP | 2011-224271 | 11/2011 |
| KR | 2005-0027491 | 3/2005 |

OTHER PUBLICATIONS

U.S. Appl. No. 61/749,735, filed Jan. 7, 2013.
U.S. Appl. No. 61/837,987, filed Jun. 21, 2013.
U.S. Appl. No. 13/235,460, filed Sep. 18, 2011.
U.S. Appl. No. 13/363,072, filed Jan. 31, 2012.
U.S. Appl. No. 14/028,741, filed Sep. 17, 2013.
amazon.com. 3M Notebook Screen Cleaning Wipes. Website, http://www.amazon.com, originally downloaded Sep. 17, 2013, 1 page.
amazon.com. 3M Office Pre-Moistened Wipes. Website, http://www.amazon.com, originally downloaded Sep. 17, 2013, 1 page.
amazon.com. Zeiss LCD Screen Cleaning Wipes. Website, http://www.amazon.com, originally downloaded Sep. 17, 2013, 1 page.
Microsoft. Bell'O Screen Cleaner Wipes. Website, http://www.microsoftstore.com, originally downloaded Oct. 21, 2013, 2 total pages.

* cited by examiner

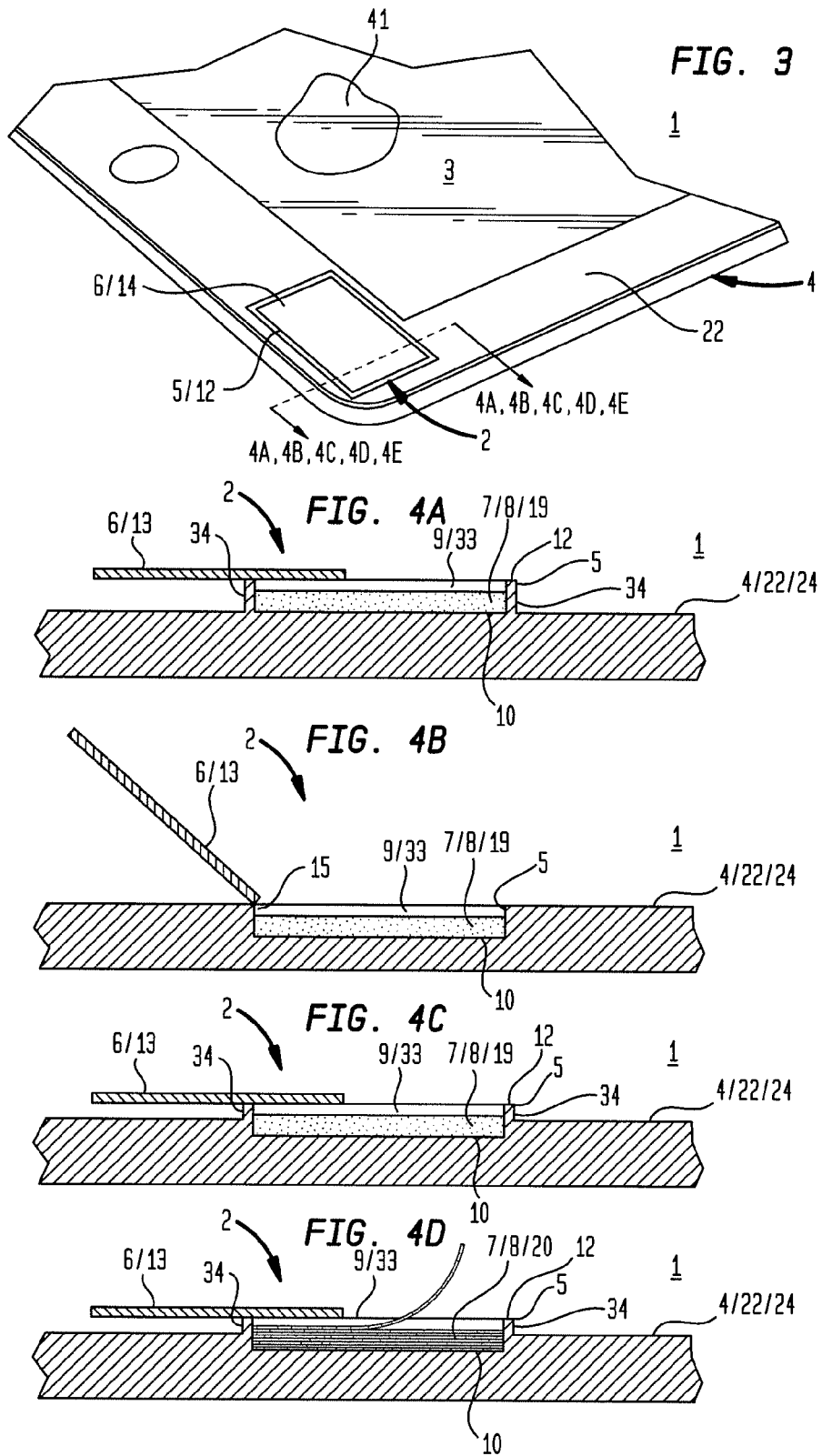

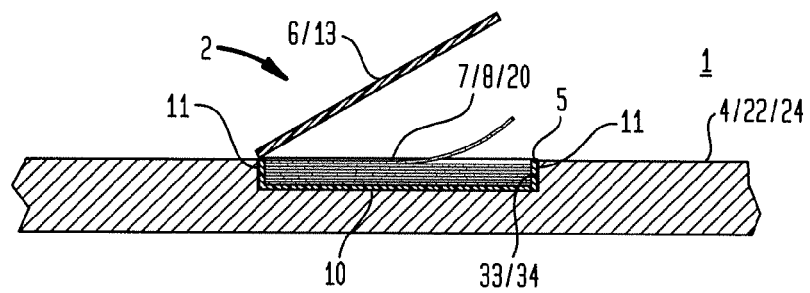
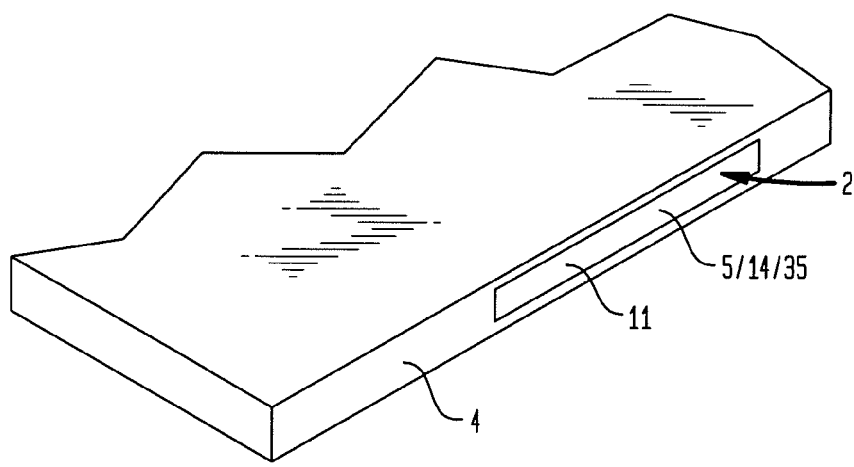
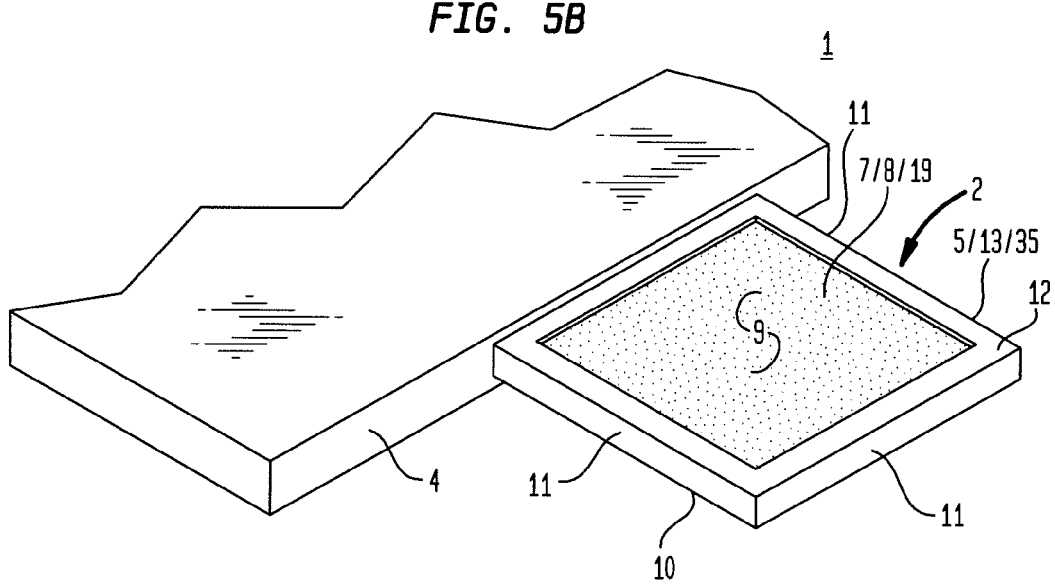

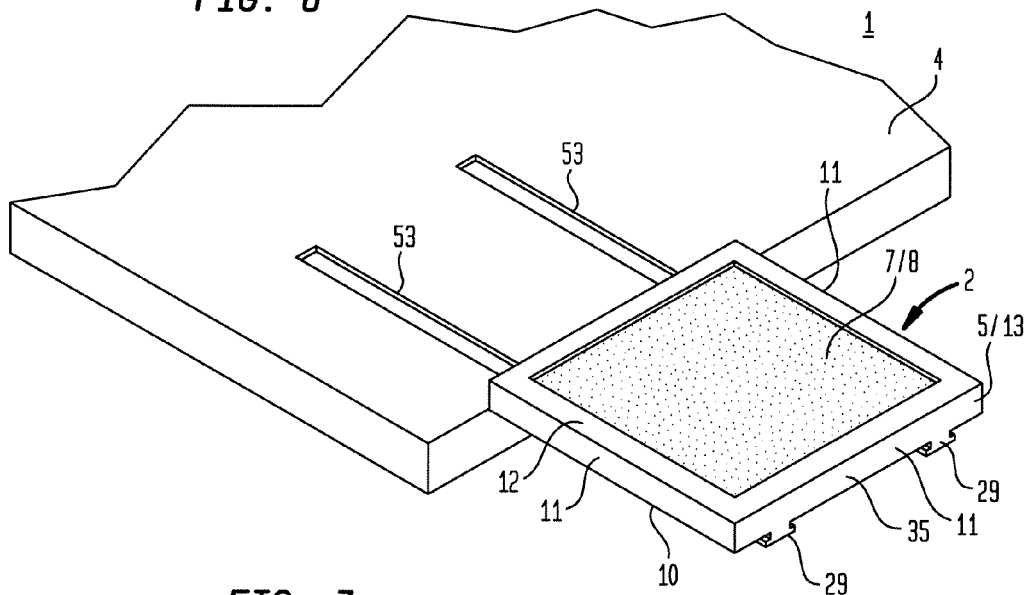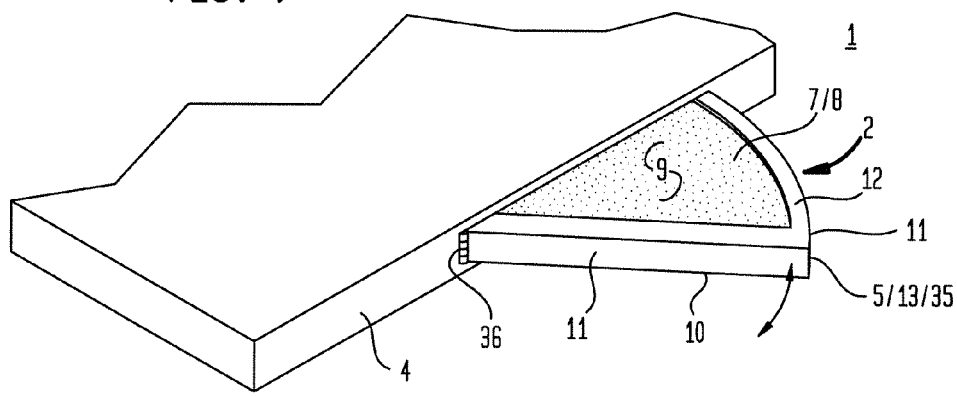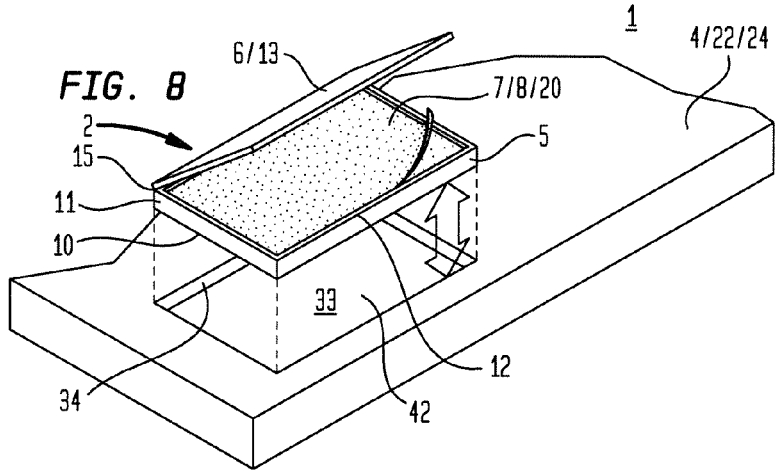

DISPLAY SURFACE CLEANING SYSTEM

This United States Patent Application is a continuation of U.S. patent application Ser. No. 14/028,741, filed Sep. 17, 2013, now U.S. Pat. No. 9,180,495, which claims the benefit of U.S. Provisional Patent Application No. 61/837,987, filed Jun. 21, 2013, U.S. Provisional Patent Application No. 61/749,735, filed Jan. 7, 2013, and U.S. Provisional Patent Application No. 61/702,155, filed Sep. 17, 2012, each hereby incorporated by reference herein.

I. BACKGROUND

Touch screens are an increasingly common feature on personal computing devices, such as smart phones and tablet computers, where size and user interface advantages accrue from consolidating multiple hardware components (for example keyboard, number pad, and the like) into a single interactive graphic user interface displayed on the touch screen.

Conventional touch screens detect the presence and location of a touch within the display area. Generally, a touch includes touching the touch display screen with a finger, hand, or other touching member. Oily residues, or smudges on the touch screen surface may be one side effect of touches which are not only unsightly and can interfere with the performance of the touch screen, but from which frequently used patterns such as a graphical password maybe inferred. In the vast majority of settings, partial or complete patterns can be easily retrieved.

There would be advantages in providing a display surface cleaning system made a part of, integral with, or which can be proximate to, the display surface of a computing device which would allow the user to readily clean the display surface directly, or indirectly by cleaning the touching member used to touch the display surface.

II. SUMMARY OF THE INVENTION

Accordingly, a broad object of the invention can be to provide a display surface cleaning system which includes a display surface cleaner which can be utilized discrete from, coupled proximate to, or is integral with the interactive display surface or the encasement of a device which includes an interactive display surface.

Another broad object of the invention can be to provide a method of cleaning a user interactive display surface to remove contaminants directly from the interactive display surface or indirectly by cleaning the touch member used to touch the display surface to avoid transfer of contaminants from the touch member to the user interactive display surface.

Naturally, further objects of the invention are disclosed throughout other areas of the specification, drawings, photographs, and claims.

III. A BRIEF DESCRIPTION OF THE DRAWINGS

FIG. 3 is perspective front view of a particular embodiment of the inventive interactive display surface cleaning system.

FIG. 4A is a cross section view 4A-4A of a particular embodiment of the inventive interactive display surface cleaning system shown in FIG. 3.

FIG. 4B is a cross section view 4B-4B of a particular embodiment of the inventive interactive display surface cleaning system shown in FIG. 3.

FIG. 4C is a cross section view 4C-4C of a particular embodiment of the inventive interactive display surface cleaning system shown in FIG. 3.

FIG. 4D is a cross section view 4D-4D of a particular embodiment of the inventive interactive display surface cleaning system shown in FIG. 3.

FIG. 4E is a cross section view 4E-4E of a particular embodiment of the inventive interactive display surface cleaning system shown in FIG. 3.

FIG. 5A is front perspective view of a particular embodiment of the inventive interactive display surface cleaning system having a slide out tray shown in the closed condition.

FIG. 5B is front perspective view of a particular embodiment of the inventive interactive display surface cleaning system having a slide out tray shown in the open condition.

FIG. 6 is a front perspective view of a particular embodiment of the inventive interactive display surface cleaning system having a container which fastens by matable parts to an encasement surrounding a user interactive display surface of a device.

FIG. 7 is front perspective view of a particular embodiment of the inventive interactive display surface cleaning system having a hinged slide out tray shown in the open condition.

FIG. 8 is an exploded front perspective view of a particular embodiment of the inventive interactive display surface cleaning system shown in FIG. 3 and FIG. 4E having a container which releasably secures in a recess element of the encasement surrounding a user interactive display surface of a device.

IV. DETAILED DESCRIPTION OF THE PREFERRED EMBODIMENTS

Figure 1:
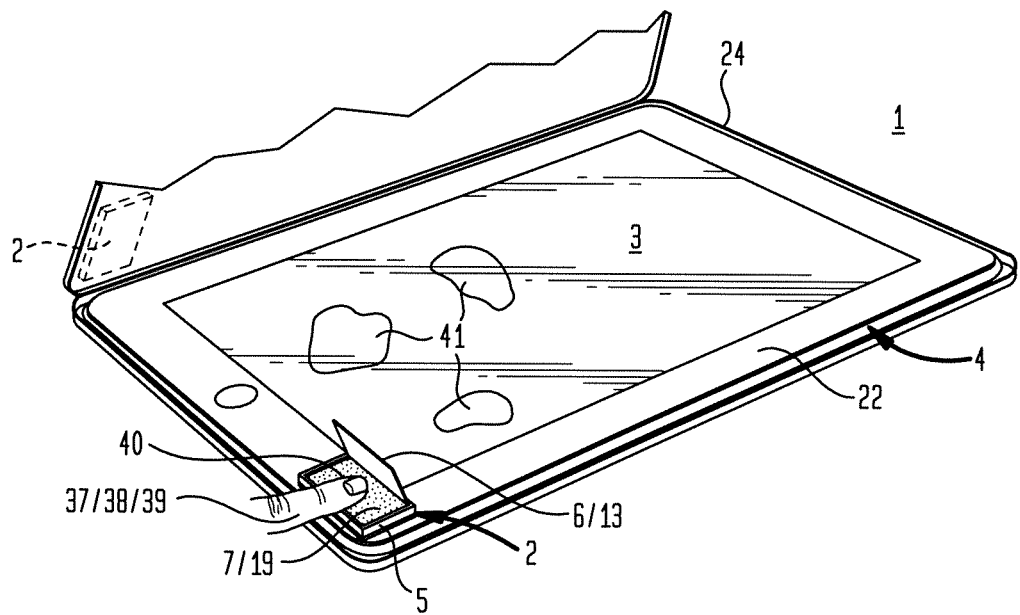
FIG. 1 is an illustration of a method of using a particular embodiment of the inventive interactive display surface cleaning system.

Now referring in general to the Figures, illustrative examples of the display surface cleaning system (1) are shown which include a display surface cleaning assembly (2) useful in cleaning a display surface (3) of a device (4). While FIGS. 1 and 9 show the device (4) in the form of a table computer, embodiments of the display surface cleaning assembly (2) can be included in, coupled to, or utilized with a numerous and wide variety of devices (4) including, as illustrative examples: writing slates, pad computers, electronic book readers, mobile phones, smart phones, camera/cell phone, personal digital assistants, personal computers, programmable consumer electronics, minicomputers, or similar devices and combinations thereof.

Figure 9:
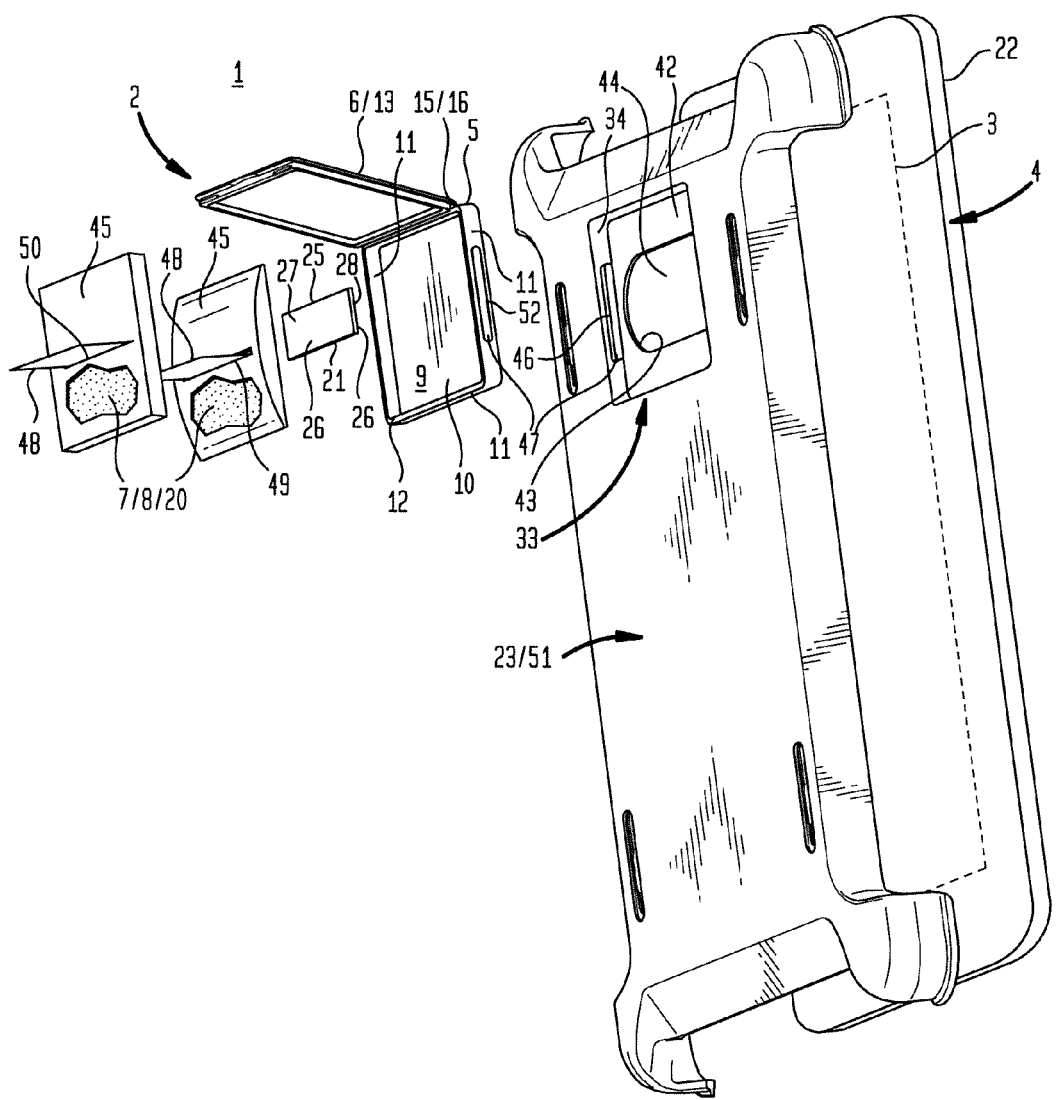
FIG. 9 is an is an exploded back perspective view of a particular embodiment of an encasement configured to removably receive a user interactive display device and including a recess element configured for use with embodiments of the inventive interactive display surface cleaning system.

Additionally, while the illustrative examples of FIGS. 1 and 9 each show a device (3) having a display surface (3) in the form of a touch screen, embodiments of the display surface cleaning assembly (2) can be utilized with a numerous and wide variety of display screens including, as illustrative examples: touch screens, liquid crystal display touch screens, touch panels, touch screen horizontal game surfaces, table top interactive displays, multi-touch displays, or similar display screens and combinations thereof.

Now referring primarily to FIGS. 2A, through 2C, 8 and 9, particular embodiments of the display surface cleaning assembly (2) can include one or more of a container (5), a cover (6), a display surface cleaning medium (7), and a cleanser (8) in various combinations. The container (5) can take any constructional form which can define an inside space (9) capable of receiving the display surface cleaning medium (7). Particular embodiments can further include a cover (6) which can interengage the top edge (12) allowing the container (5) to operate between a container open condition (13) (as shown in the examples of FIG. 2A, 2B, 2C, 8 and 9) and a container closed condition (14) (as shown in the examples of 2A, 2B, 2C, 8 and 9) in broken line).

As shown in the examples of FIGS. 2A, 2B, 8 and 9, particular embodiments of the container (5) can include a bottom panel (10) connected to four interconnected upright side panels (11) which terminate in a top edge (12) which interengages a rectangular cover (6) to enclose a substantially rectangular inside space (9); however, embodiments of the invention can, but need not be, limited to a square or rectangular container (5) and particular embodiments can include a container (5) having a triangular, pentagonal or other polygonal form or other forms which may include side panels (11) which are curved or circular or designed in the appearance of a person or thing (animal, plant, structure, or the like) depending on the application.

Figure 2A:
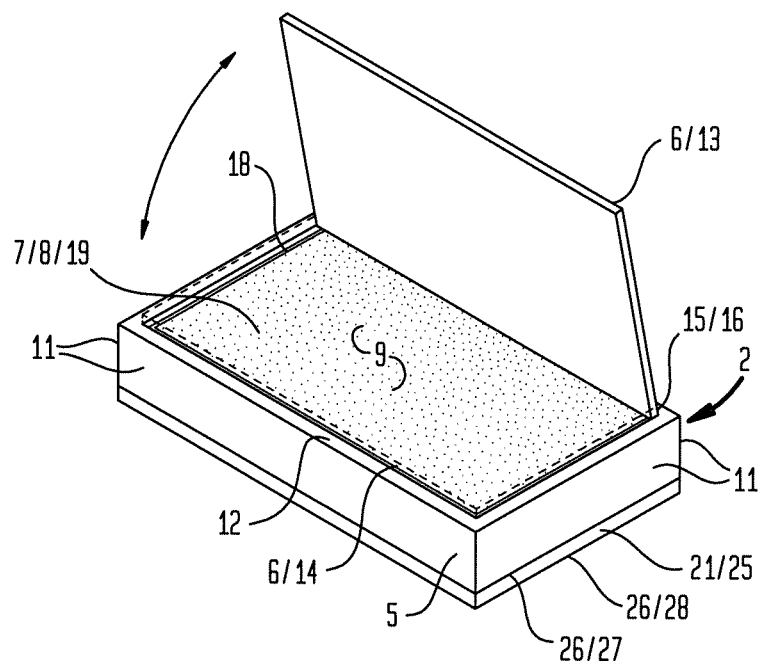
FIG. 2A is a perspective front view of a particular embodiment of the inventive interactive display surface cleaning system including a container having a hinged cover.

As shown in the illustrative example of FIGS. 2A, 8 and 9, a hinge element (15) pivotally couples one cover edge (16) to a corresponding top edge (12) of an upright side panel (11) to allow the cover (6) to rotate between the container open condition (13) and the container closed condition (14). The hinge element (15) as to particular embodiments can be a living hinge made from the same material as the two rigid pieces it connects in which the material is sufficiently thinned or cut to allow the rigid pieces to bend along the line of the hinge element (15). Other embodiments of the hinge element (15) can include a hinge of another flexible material such as: leather, plastic, metal, carbon fiber or similar flexible materials and combinations thereof.

Figure 2B:
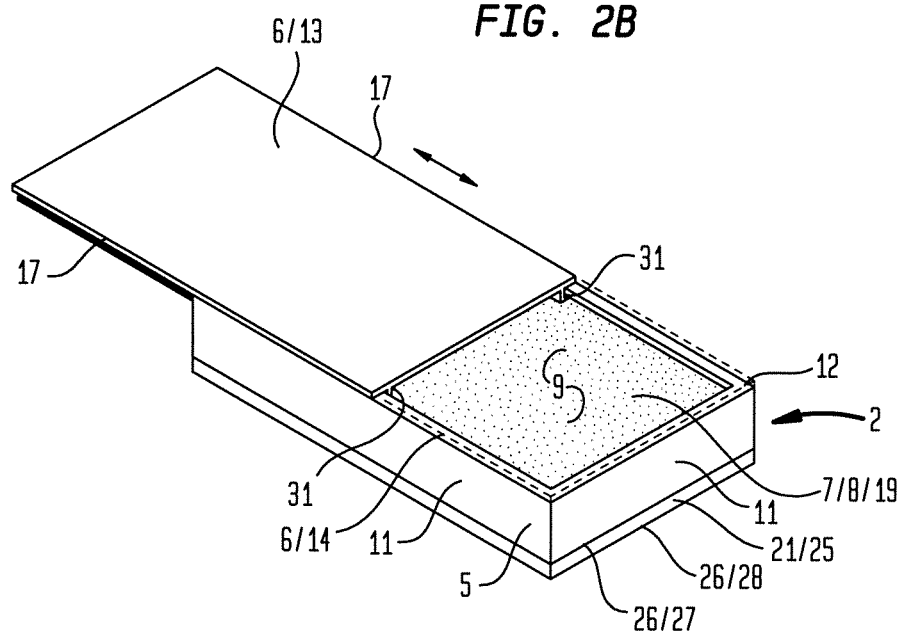
FIG. 2B is a perspective front view of a particular embodiment of the inventive interactive display surface cleaning system including a container having a slidely engaged cover.

As shown in the illustrative example of FIG. 2B, the cover (6) slidely interengages the top edge (12) of the upright side panels (11) to slide between the container open condition (13) and the container closed condition (14). As to particular embodiments, a pair of cover edges (17) can each include a pair of cover grooves (31) which slidely engage the top edge (12) of a pair of upright side panels (11).

Figure 2C:
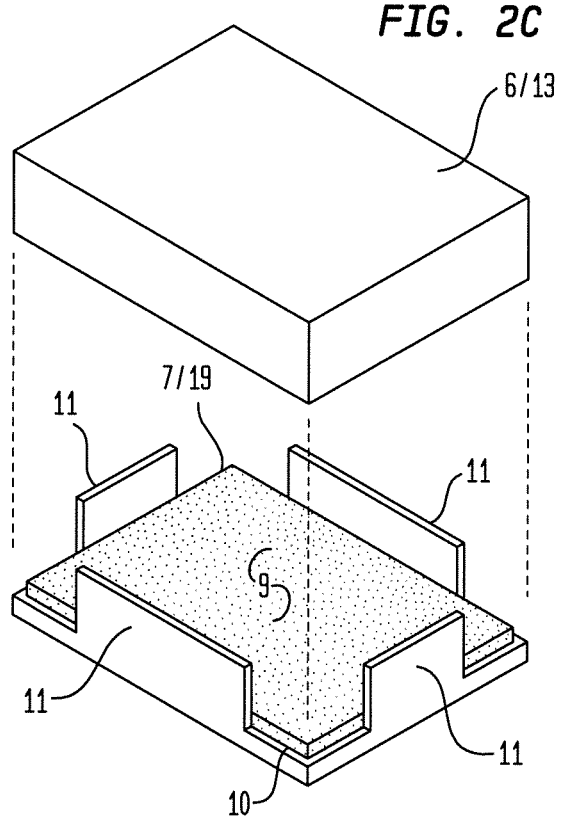
FIG. 2C is a perspective front view of a particular embodiment of the inventive interactive display surface cleaning system including a container including a container bottom connected to upright side panels which removably engages a discrete cover.

As shown in the illustrative example of FIG. 2C, the container (5) can include a bottom panel (10) connected to three or more upright side panels (11) which are not otherwise interconnected but define an inside space (9) configured to receive the display surface cleaning medium (7). As to particular embodiments of the above examples, the cover (6) may be absent or configured as discrete element which removably interengages the top edge (12) of the upright side panels (11), or includes a hinge element (15).

Now referring primarily to FIG. 2A, 2B, and 9, as to particular embodiments, the container (5) and the cover (6) can interengage to sufficiently sealably enclose the inside space (9) to prevent or sufficiently reduce evaporation of the cleanser (8) from the display surface cleaning medium (7) to allow use of the display surface cleaning medium (7) containing a cleanser (8) over a useful period of time depending upon the application, configuration of the display surface cleaning medium (7), and the formulation of the cleanser (8).

Particular embodiments of the invention can further include a cover seal (18), which can be discrete from or unitary with the container (5) or the cover (6) and configured to be interengaged by the container (5) and the cover (6) in the container closed condition (14) to sealably enclose the inside space (9).

The above illustrative examples of the container (5) and the interengagement of the container (5) with the cover (6) are intended to allow a person of ordinary skill in the art to make and use a numerous and wide variety of embodiments of the container (5) or container (5) and cover (6) to receive the display surface cleaning medium (7), whether or not containing a cleanser (8). Understandably, the cover (6) can take any form that can interengage with the container (5) to provide the open condition (13) during periods of use and the closed condition (14) between periods of use.

Again referring generally to the Figures, the display surface cleaning medium (7) can be of any material compatible with the display surface (3) of a device (4). As to particular embodiments, the display surface cleaning medium (7) can comprise one layer (19) (as shown in the examples of FIGS. 2A and 2B) or a plurality of layers (20) (as shown in the examples of FIGS. 4D, 4E, 8 and 9). As to particular embodiments, the plurality of layers (20) can take the form of a stack of discrete or interleaved sheets (as shown in the examples of FIGS. 4D, 8 and 9). The display surface cleaning medium (7) can be configured to be received or removably received within the inside space (9) of the container (5).

Again referring to the Figures in general, as to particular embodiments, the display surface cleaning medium (7) can contain a cleanser (8). Accordingly, the display surface cleaning medium (7) can be made from a material both compatible with the display surface (3) of a device (4) and further having retentive forces in relation to a particular cleanser (8) which predominate over hydrostatic forces between uses of the display surface cleaning assembly (2) and which further allows transfer of a portion of the cleanser (8) from the display surface cleaning medium (7) to the display surface (3) of the device (4) during use of the display surface cleaning assembly (2), as further described below. As illustrative examples, the display surface cleaning medium (7) can be a pad having one layer (19) or a plurality of layers (20) made of any of a numerous and wide variety of materials, such as: a water laid fiber or an air laid fiber (such as "fluff pulp") and binder, a partially open cell sponge-like hydrophilic material, a sponge-like hydrophobic material covered with a hydrophilic layer, a polyvinyl alcohol foam with no visible pores, a polyester sponge-like material, or the like, and combinations thereof.

The cleanser (8) can be applied in sufficient amount to the display screen cleaning medium (7) whether before or after the display screen cleaning medium (7) is received inside the container (5). The cleanser (8) can be any of a numerous and wide variety of substances, solutions, compositions, and combinations thereof, including as illustrative examples, distilled water, de-ionized water, white vinegar, methyl alcohol, ethyl alcohol, isopropyl alcohol, ethylene glycol monohexylether, ammonia, 2-butoxyethanol, acetone, or the like, capable of or useful in removing contaminants (41) (as shown in the example of FIGS. 1 and 3) from the display surface (3) of the device (4) or from the touching member (37) used to touch the display surface (3).

Now referring primarily to FIGS. 8 and 9, as to particular embodiments of the display surface cleaning assembly (2), the container (5) including the display surface cleaning medium (7) retaining an amount of cleanser (8) interengaged by the cover (6) in the container closed condition (14) can be stored discrete from the device (3) between periods of use.

Now referring primarily to FIG. 1, particular embodiments of the display surface cleaning assembly (2) can further include an adherent layer (21) which allows fixed or releasable engagement of display surface cleaning assembly (2) to a device (4). While the example of FIG. 1 shows the display surface cleaning assembly (2) adhered or removably adhered to the annular frame (22) surrounding the display surface (3) of a device (4) in the form of a tablet computer, the display surface cleaning assembly (2) can be adhered directly to the interactive display surface (3), to an encasement (23) releasably securable to the device (4), to a carrying case (24) in which the device (4) having the interactive display surface (3) stores, or to any surface useful in relation to using the display surface cleaning assembly (2) with the device (4) to clean the display surface (3) such as a table, desk, work station, or the like.

As an illustrative example, the adherent layer (21) can be a carrier material (25) (any of a wide variety of plastics, foams, papers, or the like) having an adherent (26) on opposed sides (27)(28) such that a first side (27) engages the container (5) (as to particular embodiments, the bottom panel (10) as shown in the examples of FIGS. 1, 2A and 2B) and the second side (28) engages a surface of the interactive display surface (3), the encasement (23), the interactive display surface (3), the annular frame (22) about the interactive display surface (3) or the carrying case (24), to affix the display surface cleaning assembly (2) thereto. Understandably, the adherent layer (21) can also be any of wide variety of liquid or semi-liquid compositions, contact adhesives, hot adhesives, multipart adhesives, or the like, an amount of which can be contacted with the display surface cleaning assembly (2) to fix or releasably fix the display surface cleaning assembly (2) to a surface.

Now referring primarily to FIG. 6, other embodiments of display surface cleaning assembly (2) can further include mateable parts which allows fixed or releasable engagement of the display surface cleaning assembly (2) to or proximate to display surface (3) of a device (4). As shown in the illustrative example of FIG. 6, a pair of tongues (29) can extend from the bottom panel (10) of the container (5) and slidely engage a corresponding pair of grooves (53) in the surface of the device (4), the annular frame (22) surrounding the display surface (3), an encasement releasably secured to the device (4), or a carrying case (24). Other illustrative examples of mateable parts include snap-fit and release parts, releasably engaged pieces of hook material and a loop material, or the like.

Now referring primarily to FIGS. 3 and 4A through 4E, embodiments of the display surface cleaning assembly (2) can be assembled, fabricated or molded as part of, integral to, or unitary with the device (4) including the display surface (3) and while FIG. 3 shows the display surface cleaning assembly (2) included in the annular frame (22) surrounding the interactive display surface (3), other embodiments can dispose the display surface cleaning assembly (2) in the surface of the device (4) at other locations whether on the front or back surface. As illustrative examples, the container (5) can be provided as a recess (33) (as shown examples of FIGS. 4B-D), as a plurality of interconnected upright side panels (34) (as shown in the example of FIG. 4A), or in part a recess (33) and in part a plurality of interconnected upright side panels (34) (as shown in the examples of FIGS. 4C and 4D) each recessed in or extending outward from the surface of the interactive display surface (3). Understandably, the container (5) and the cover (6) can be made to interengage in a numerous and wide variety of structural forms, as above described, even though the particular illustrative examples of the container (5) and the cover (6) of FIGS. 4A-4E are shown as substantially rectangular.

As shown in the example of FIGS. 1, 4E, 8, and 9 the recess (33) can be provided by a recess bottom panel (42) connected to a plurality of interconnected upright recess side panels (34) extending outward in whole or in part from the surface of the device (4), or the encasement (23) releasably secured to the device (4), or the carrying case (24) in which the device (4) can be located, can be configured as a container securement structure (47) having a configuration which releasaby secures the container (6).

Now referring primarily to FIGS. 5A, 5B, and 7, particular embodiments of the container (5) and cover (6) can take the form of a slide out tray (35) which extends from (as shown in the example of FIG. 5B) and retracts into (as shown in the example of 5A) the device (4) to correspondingly provide the container open condition (13) and the container closed condition (14). Extension and retraction of the slide out tray can be accomplished manually or by a drive mechanism located inside of the device (4).

Now referring primarily to FIG. 7, particular embodiments of the slide out tray (35) swingingly extend from and retract into the device (4) and pivot about a pivot element (36) coupled between the device (4) and upright side panel (11) of the container (5). Extension and retraction of the slide out tray (35) can be accomplished manually or by a drive mechanism located within the encasement (23).

Now referring primarily to FIG. 9, particular embodiments of the invention can comprise an apparatus for cleaning a display surface (3) of device (4) including an encasement (23) configured to secure, or removably secure to a device (4) having a display surface (3), which can be, but is not necessarily, a mobile device having a touch screen. While the encasement (23) shown in FIG. 9 has a configuration which removably secures to a tablet computer (4) without covering the display screen (shown in broken line), embodiments of the encasement (23) can be configured to removably secure to any one or more of a numerous and wide variety of devices (4) having a display screen (3). The device (4) secured, or removably secured, to the encasement (24) can be any one or more or a numerous and wide variety of devices (4) having a display surface (3), including, without limitation to the breadth of the forgoing: slate computers, pad computers, electronic book readers, mobile phones, smart phones, camera/cell phone, personal digital assistants, or the like.

The encasement (23) can further include a container (5) configured to removably retain the display surface cleaning medium (7). With respect to the illustrative embodiment of FIG. 9, the container (5) can take the form of a recess element (33) disposed in the surface of the encasement (23).

While the recess element (33) is shown at a location on the back side (51) of the encasement (23); the recess element (33) can be disposed at any location on the encasement (23) which allows the device (4) to be removably secured to the encasement (23). While the recess element (33) shown in FIG. 9 has a bottom panel (10) connected to a plurality of interconnected upright side panels (34) in a rectangular configuration, the recess element (33) can take any structural form which can be disposed in the surface of the encasement (23) and allows the encasement (23) to be secured, or removably secured, to a device (4).

As to other embodiments, a discrete container (5) can be removably received within the recess element (33). The container (5) can be configured in any structural form which affords matable surfaces which allow the container (5) to removably secure inside of the recess element (33). Without limitation to the breadth of the forgoing, the recess element (33) and the container (5) can afford matable surfaces being triangular, square, rectangular, elliptical, round, or the like.

The container (5) and the recess element (33) can further include matable portions of one or more detents (46) and a corresponding one or more detent receiving elements (52) which releasably engage to releasably retain the container (5) within the recess element (33). One or more detents (46) can outwardly project from one or more of the interconnected upright panels (34) to releasably engage a corresponding one or more detent receiving elements (52) disposed in a corresponding one or more of the container side panels (11) of the container (5). The detent elements (46) can be configured to operate with greater or lesser engage and disengage forces depending on the application. In the illustrative example of FIG. 9, a pair of detents (46) are disposed on opposed upright side panels (11) of the container (5) and matably engage a corresponding pair of detent receiving elements (52) disposed on opposed upright side panel (34) of the recess element (33).

The recess element (33) can further include a pass through element (43) which defines a pass through opening (44) between opposed surfaces of the encasement (23). The pass through element (43) located adjacent the container bottom panel (10) of the container (5). The pass through opening (44) having sufficient area to allow the bottom panel (10) of the container (5) to be engaged and by sufficient forcibly urging displaced from the recess element (33). As to certain embodiments, the encasement (23) or the container (5) can be sufficient thin or perforated to allow deformation sufficient to displace the container (5) from the recess element (33).

A display surface cleaning medium (7) compatible with the display screen (3) can be releasably retained within the container (5). The display surface cleaning medium (7) can comprises a one layer display surface cleaning medium (19) or a plurality of display surface cleaning layers (20) in the form of a plurality of cleaning sheets (48) whether stacked or interleaved in relation to one another.

Embodiments can further include a cleanser (8) contained by the display surface cleaning medium (7), the cleanser compatible with display surface cleaning medium (7) and the display surface (3), as above described.

Particular embodiments can further include a cleaning medium overwrap (45) which encloses the display surface cleaning medium (7). The cleaning medium overwrap can be produced from a substantially rigid or substantially flexible material (shown in the example of FIG. 9 in the alternative). In the example of FIG. 9, the display surface cleansing medium (7) can be disposed within an substantially rigid cleaning medium overwrap (45) having an over wrap aperture (49) through which the display surface cleansing medium (7) can egress one at a time from a plurality cleaning sheets (48) enclosed within the cleaning medium overwrap (45). However, particular embodiments of the cleaning material overwrap (45) can be of a flexible material which upon opposed forcible urging detaches along a separation line (50) to provide an over wrap aperture (49) which allows passage of one or more of the plurality of cleaning sheets (48) from inside of the cleaning medium overwrap (45). The overwrap element (45) can be produced from a wide variety of materials compatible with the display surface cleaning medium (7) and the cleanser (8) including as illustrative examples: thin sheet or film material such as polyethylene, polypropylene, or the like with a thickness adjusted to afford sufficient rigidity depending on the application.

As to particular embodiments, an adherent layer (21), as above described, can be utilized to removably secure the overwrap element (45) containing the display surface cleaning medium (7) inside of the container (5); however, other embodiments can utilize snap-fit and release parts, releasably engaged pieces of hook material and a loop material, or the like to removably secure the overwrap element (45) inside of the container (5).

The container (5) can further include a container cover (6) which operates between a container closed container condition (14) and an container open condition (13) which allows access to the display surface cleaning medium. As to particular embodiments, the encasement (23) and the container (5) and further including the container cover (6) can be, but is not necessarily, a unitary structure.

Now referring to the Figures in general the invention also includes methods of producing embodiments of the apparatus and methods of cleaning a display surface (3) of a device (4).

Now referring primarily to FIGS. 1 and 9, an illustrative method of using embodiments of the display surface cleaning assembly (2) is shown. In a step of the method, the display surface cleaning assembly (2) can be provided in the container open condition (13) allowing access to the display surface cleaning medium (7) containing an amount of cleanser (8). The display surface cleaning medium (7), which as to particular embodiments can contain an amount of cleanser (8), can be removed in whole or in part from the container (5) and engaged with the display surface (3).

Now referring primarily to FIG. 1, as to other embodiments of the method, a portion or all of a touching member (37) can be engaged with the display surface cleaning medium (7) to treat a portion of the touching member (37). As to particular embodiments, engaging the touching member (37) with display surface cleaning medium (7) further treats the touching member with an amount of cleanser (8). The touching member (37) can be an appendage (38) of the human body. One or more finger tips (39) or finger-tip surfaces (40) can be treated by engagement with the display surface cleaning medium (7) which can transfer an amount of cleanser (8) to the finger-tip surfaces (40) to be treated; however, the method includes similar treatment of a numerous and wide variety of touching members (37), as examples: a pen, a stylus, a finger-tip stylus, an artificial finger-tip, a finger-tip protector, a finger-tip end sheath, or the like, and combinations thereof.

Sufficient forcible urging of the display surface cleaning medium (7) which can contain the cleanser (8) with the display surface (3) or sufficient forcible urging of the touching member (37) to the display surface cleaning medium (7) can displace, reduce, or remove contaminants (41) from the treated portion of the interactive display surface (3) or the touching member (37). Contaminants (41) broadly include any type of material removable from the display surface (3) or from the touching member (37) by engagement and additional sufficient forcible urging of the display surface cleaning medium (7) with the interactive display surface (3) or the touching member (37). Contaminants (41) on the interactive display surface (3) or the touching member (37)(whether an appendage of the human body such as a finger or an artificial member) can include sweat, oils, minerals, lactate, urea, dead skin cells along with other materials such as food, liquids, saliva, mucus, solid particles, aerosols, dust, lotions, oils, grease, cosmetics, soap, disinfectant, cleansers, or the like, and combinations thereof.

The treated display surface (3) or the treated touching member (37) can be allowed to dry. The touching member (37) can be engaged with the surface of the interactive display screen (3). The displacement, reduction or removal of contaminants (41) on the display surface (3) or touch member (37) confers a substantial advantage in that the display surface (3) can be less unsightly, less subject to pattern recognition, or operate with increased dependability. The display surface cleaning assembly (2) can then be placed in the closed condition (14) between periods of use.

Now referring primarily to FIG. 9, the method of cleaning a display suface (3) can include obtaining an encasement (23) configured to releasably secure to a device (4) having a display surface (3). The encasement can include a container (5) configured to releasably retain a display surface cleaning medium (7) for cleaning the display surface (3) of the device (4), which can be a mobile device, as above described. The method can further include obtaining the display surface cleaning medium (7) and releasably retaining the display surface cleaning medium (7) in the container (5). As to particular embodiments, the display surface cleaning medium (7) contains a cleanser (8) compatible with said display surface (3).

As to particular embodiments, the display surface cleaning medium (7) can further include a display cleaning medium overwrap (45) which encloses the display surface cleaning medium (7). The method can further include separating the cleaning medium overwrap (45) along a separation line (50) to provide an over wrap aperture (49) which allows passage of one or more of said plurality of cleaning medium sheets (48) from said cleaning medium overwrap (45).

The method can further include releasing the container (5) from a container securement structure (47) of the encasement (23). As to particular embodiments, releasing the container (5) further includes releasing the container (5) from a container securement structure (47) in the form of an encasement recess (33) configured to releasably receive the container (5). Releasing the container can further include disengaging one or more detents (46) which project outwardly from one more encasement recess panels (11) from a corresponding one or more detent receiving elements (52) disposed in one or more container side panels ( ).

The method can further include passing an appendage (38) through a pass through opening (44) to engage the container bottom panel (10), and by forcibly urging the appendage (38) against the container bottom panel (19), releasing the container (5) from said container securement structure (47) of the encasement (23).

The method can further include operating a container cover (6) between a container closed condition (14) and a container open condition (13) which allows access to the display surface cleaning medium (7), removing the display cleaning medium (7) from said container (5), and cleaning said display screen (3) the device (3) by engaging said display cleaning medium (7) with the display screen (3) of the device (3). The method further includes sealably engaging the container cover (6) and the container (5) with a container seal (18) in the container closed condition (14).

The method can further include releasably securing a mobile device (4) to the encasement.

As can be easily understood from the foregoing, the basic concepts of the present invention may be embodied in a variety of ways. The invention involves numerous and varied embodiments of a mountable carrier and methods for making and using such mountable carrier including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "cleanser" should be understood to encompass disclosure of the act of "cleaning" —whether explicitly discussed or not—and, conversely, were there effectively disclosure of the act of "cleaning", such a disclosure should be understood to encompass disclosure of a "cleanser" and even a "means for cleaning." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each display surface cleaning system and display surface assembly herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain U.S. patents, patent applications, publications, or subject matter of the claimed invention useful in relating information, problems, or concerns about the state of technology to which the invention is drawn toward. It is not intended that any U.S. patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method, comprising:
    forming an encasement releasably securable to a device having a display surface to dispose an encasement first side adjacent said device without covering said display surface of said device; and
    disposing a container in an encasement second side, said container having a container cover operable between a closed condition and an open condition, said container having an inside space configured to releasably retain a display surface cleaning medium.

2. The method of claim 1, further comprising providing a display surface cleaning medium releasably retained within said container.

3. The method of claim 2, further comprising providing a cleanser contained by said display surface cleaning medium, said cleanser compatible with said display surface.

4. The method of claim 3, further comprising overwrapping said display surface cleaning medium with an overwrap.

5. The method of claim 4, wherein said display surface cleaning medium comprises a one-piece display surface cleaning medium.

6. The method of claim 3, further comprising coupling a container seal to one of said container and said container cover, said container cover and said container sealably engage said container seal in said container closed condition.

7. The method of claim 4, wherein said display surface cleaning medium comprises a plurality of display surface cleaning sheets.

8. The method of claim 7, further comprising providing a separation line in said overwrap, said overwrap detachable along said separation line to provide a sheet dispensing outlet which allows passage of one or more of said plurality of cleaning medium sheets from said cleaning medium overwrap.

9. The method of 1, further comprising forming said encasement and said container as a one piece unitary structure.

10. The method of claim 1, further comprising coupling one or more detents to one or more encasement recess sidewalls, said one or more detents outwardly projecting from said one or more encasement recess sidewalls to releasably engage a corresponding one or more detent receiving elements disposed in one or more container sidewalls of said container.

11. The method of claim 10, further comprising disposing an aperture element within said encasement recess, said aperture element communicating between said encasement first side and said encasement second side to define a pass through between said encasement first side and said encasement second side within said encasement recess.

12. The method of claim 1, wherein said device having a display surface comprises a mobile device having said display surface.

* * * * *